United States Patent [19]

Ryan

[11] 4,354,232
[45] Oct. 12, 1982

[54] CACHE MEMORY COMMAND BUFFER CIRCUIT

[75] Inventor: Charles P. Ryan, Phoenix, Ariz.

[73] Assignee: Honeywell Information Systems Inc., Phoenix, Ariz.

[21] Appl. No.: 186,362

[22] Filed: Sep. 11, 1980

Related U.S. Application Data

[63] Continuation of Ser. No. 861,228, Dec. 16, 1977, abandoned.

[51] Int. Cl.³ .............................................. G06F 13/00
[52] U.S. Cl. .............................. 364/200; 235/92 DP; 235/92 CC; 365/189; 365/230; 365/236
[58] Field of Search ... 364/200 MS File, 900 MS File

[56] References Cited

U.S. PATENT DOCUMENTS

| 3,581,291 | 5/1971 | Iwamoto | 364/200 |
| 3,588,829 | 6/1971 | Boland | 364/200 |
| 3,618,041 | 11/1971 | Horikoshi | 364/200 |
| 3,670,307 | 6/1972 | Arnold et al. | 364/200 |
| 3,699,530 | 10/1972 | Capowski et al. | 364/200 |
| 3,705,388 | 12/1972 | Nishimoto | 364/200 |
| 3,725,876 | 4/1973 | Hauck | 364/200 |
| 3,729,712 | 4/1973 | Glassman | 364/900 |
| 3,766,532 | 10/1973 | Liebel, Jr. | 364/200 |
| 3,771,137 | 11/1973 | Barner | 364/200 |
| 3,810,110 | 5/1974 | Kotok et al. | 364/200 |
| 4,056,848 | 11/1977 | Gilley | 364/200 |
| 4,070,706 | 4/1978 | Scheuneman | 364/200 |
| 4,084,234 | 4/1978 | Calle et al. | 364/200 |

Primary Examiner—Joseph M. Thesz
Assistant Examiner—Archie Edward Williams, Jr.
Attorney, Agent, or Firm—W. W. Holloway, Jr.; N. Prasinos; L. J. Marhoefer

[57] ABSTRACT

In a computer system, with a system interface unit (SIU) for controlling data transfers between a lower speed main memory and either a central processor unit (CPU) or a high-speed cache memory unit (CMU), a cache memory command buffer (CMCB) circuit allows the SIU and CMU to operate independently of each other and ensures that commands to the CMU and SIU are executed in proper sequence. The CMCB circuit includes a stack sequence control scheme with circuitry for storing read and write signals from the CPU into read and write buffers and for outputting these signals to the CMU and SIU without interrupting the operation of either unit. The sequence control circuit includes an address decision network, a stack memory containing buffer pointers which indicate where the CPU read/write signals are located in the buffers, and a plurality of pointer registers or binary counters which indicate where buffer pointers (for particular read/write operations by the CMU or SIU) are located in the stack memory.

5 Claims, 6 Drawing Figures

CACHE MEMORY COMMAND BUFFER CIRCUIT

This is a continuation of application Ser. No. 861,228, filed Dec. 16, 1977, now abandoned.

CROSS-REFERENCES TO RELATED APPLICATIONS

"Data Processing System Programmable Pre-Read Capability" invented by John E. Wilhite, William A. Shelly and Charles P. Ryan, filed on Nov. 22, 1977, having Ser. No. 853,944 and assigned to the assignee of the instant invention.

BACKGROUND OF THE INVENTION

1. Field of the Invention

This invention relates generally to a cache memory unit utilized by a data processing system and more particularly to a buffer stage between the cache memory and the main memory unit.

2. Description of the Prior Art

It is known in the prior art to utilize a cache memory unit to provide improved performance in a data processing unit. The performance of a data processing unit is determined, at least in part by the time required to retrieve data from the system main memory unit. The period of time required to retrieve data from the main memory can be minimized by implementing these circuits in the technology currently providing the highest speed. Because of the increasing memory requirements of modern data processing systems, this partial solution can be unacceptably expensive. In addition, delays caused by the physical distance between the central processing unit and the main memory can be unacceptable.

Because of these and other considerations, it has been found that a cache memory unit, associated with the central processing unit, provides a satisfactory compromise for providing the central processing unit with a requisite data availability. The cache memory unit is a high speed memory of relatively modest proportions which is conveniently located in relation to the central processing unit. The contents of the cache memory are selected to be those for which there is a high probability that the central processing unit will have an immediate requirement. To the extent that the algorithms of data processing system have transferred data required by the central processing unit from the main memory to the cache memory unit prior to the actual requirement by the central processing unit, the manipulation of data by the data processing system can be efficiently accomplished.

However, the transfer of the data from the main memory to the cache memory can be complicated. In the modern data processing system, an interface unit, which can be referred to as a system interface unit, can be interposed between the main memory and the central processing unit. The system interface unit is in effect a complex electronic switch controlling the interchange of data between the main memory (which may comprise several independent units), the central processing unit, and peripheral devices, which may be utilized in entering data into or retrieving data from the data processing unit. Thus the circuits in the system interface unit necessary to process the data transfer between the main memory and the cache memory may be unavailable, at least temporarily. Similarly, the central processing unit may have initiated activity in the cache memory unit which would similarly render the cache memory temporarily incapable of participating in the data transfer.

In situations where the two units or resources in a data processing system can be independently unavailable for data processing activity, such as a data transfer, it is known in the prior art to provide circuitry, which interrupts present activity of the required units or which prohibits future activity of the two units according to predetermined priority considerations, thereby freeing the resources or units of the data processing system for execution of the data transfer. This type of resource reservation can impact the overall efficiency of the data processing system by delaying execution of certain data mainpulations at the expense of other types of manipulations.

It is also known in the prior art to provide circuitry to permit the partial execution of a data transfer, a storing of the data at an intermediate location and then the completion of the execution at a later time, i.e., when the system resource becomes available. Thus, a buffering between the main memory unit and the cache memory unit can be accomplished, permitting the two units to operate in a generally independent manner. This type of data manipulation execution has the disadvantage that, after completion, the succeeding data transfers are again limited by the availability, prior to continuation of the sequence of data transfers, of each resource necessary to the completion of the data transfer.

It is therefore an object of the present invention to provide improved transfer of data between a main memory unit and a central processing unit of a data processing system.

It is a further object of the present invention to provide improved transfer of data between a main memory unit and a cache memory unit in a data processing system.

It is still a further object of the present invention to provide a buffer stage, associated with the cache memory unit which controls the transfer of information between the main memory unit and the cache memory unit.

It is a more particular object of the present invention to provide a buffer stage between the cache memory and the system interface unit.

It is still another particular object of the present invention to provide a buffer stage associated with the cache memory which permits sequential execution of data transfer activity between the system interface unit and central processing unit.

It is yet another object of the present invention to provide a buffer stage associated with the cache memory unit which permits sequential execution of data transfer instructions stored in the buffer stage while permitting execution of the activity involving the cache memory unit and the activity involving the system interface unit to be completed independently for the stored instructions.

SUMMARY OF THE INVENTION

The aforementioned and other objects are accomplished, according to the present invention, by a cache memory command buffer which includes a series of storage registers, for storing read and write data transfer commands and associated data, apparatus for providing sequential execution of the portion of a stored instruction involving the system interface unit, apparatus for providing sequential execution of a portion of the stored instruction involving the cache memory unit, and apparatus for signaling the completion of stored instruction.

The independent execution of the portion of the stored instruction involving the system interface unit and the portion of the instruction involving the cache memory permits overlapped instruction execution. In addition, the complete instruction will be executed in the sequential order received by the cache memory command buffer.

These and other features of the invention will be understood upon reading of the following description along with the drawings.

DESCRIPTION OF THE PREFERRED EMBODIMENT

Detailed Description of the Figures

Figure 1:
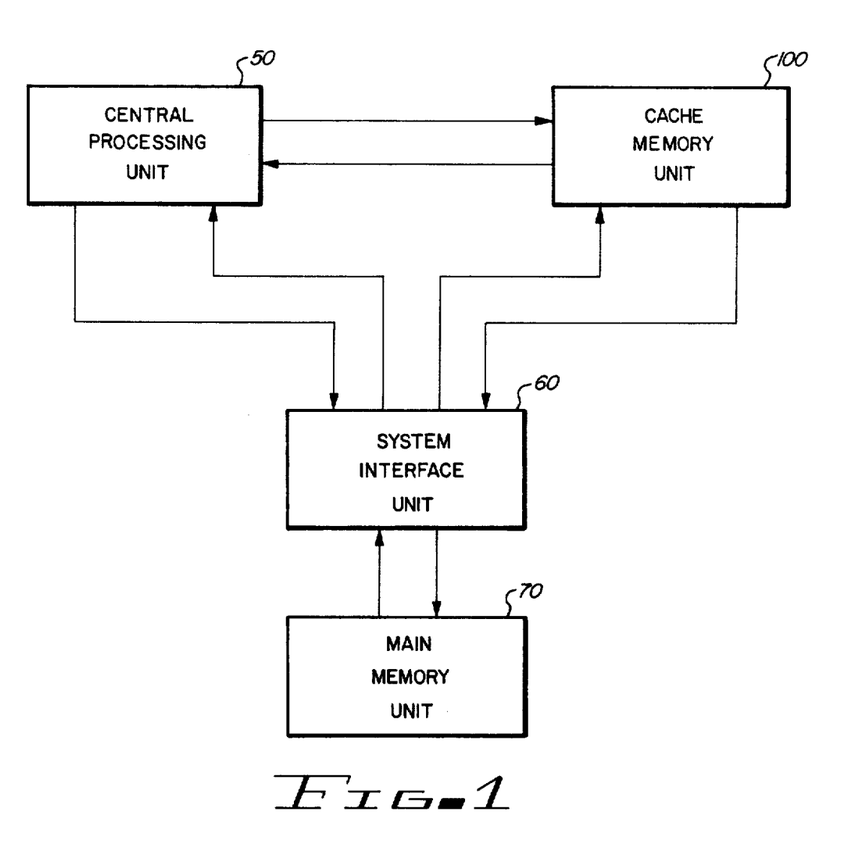
FIG. 1 is a schematic block diagram of a data processing system utilizing a cache memory unit.

Referring now to FIG. 1, the general organization of a data processing system utilizing a cache memory unit is shown. A central processing unit 50 is coupled to a cache memory unit 100 and to a system interface unit 60. The system interface unit is coupled to memory unit 70. The central processing unit 50, the memory unit 70, and the system interface unit 60 can be comprised of a plurality of individual units, all appropriately coupled and controlled for accurate execution of signal manipulation.

Figure 2:
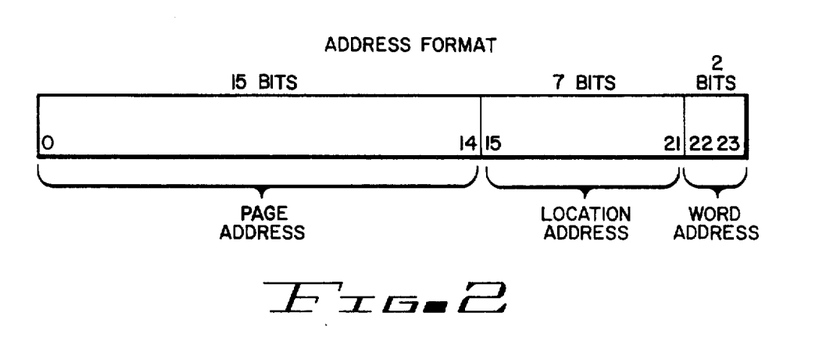
FIG. 2 is a schematic diagram of the address format utilized by the data processing system as organized for use in the cache memory unit.

Referring next to FIG. 2, the format of a data address, comprised of 24 binary bits of data, utilized by a data processing system is shown. The first 15 most significant bits identify a page address of data. Each page of data comprises 512 data words. In the embodiment each word is composed of 40 binary data bits, this number being a matter of design choice. Of the 512 data words identified by the remaining 9 binary bits of each data page, each group of the next 7 binary bits of data is associated with a location of groups of memory storage cells in the cache memory and is a location address in the cache memory. That is, there are 128 memory locations in the cache memory, and each location is identified with a combination of binary bits in the second most significant bit assemblage. The two least significant bit assemblages of the address format, in the present embodiment, are not utilized in identifying a word address in the cache memory unit. For efficient exchange of data between the cache memory unit and the memory unit, a block of four data words is transferred with each data transfer operation. Because the data transfer occurs in blocks, there is no need to utilize the least significant bits in identifying the transferred information to the main memory. The four words comprising the block will, in normal data transfer, always be present in any event. In the illustrations in FIG. 2, the address format begins at bit position zero. However, this is a matter of design choice and other address formats can be utilized. Similarly, the address format can contain additional information, such as parity or status designations, when the address format is a larger (i.e., more than 24) group of binary data bits.

Figure 3:
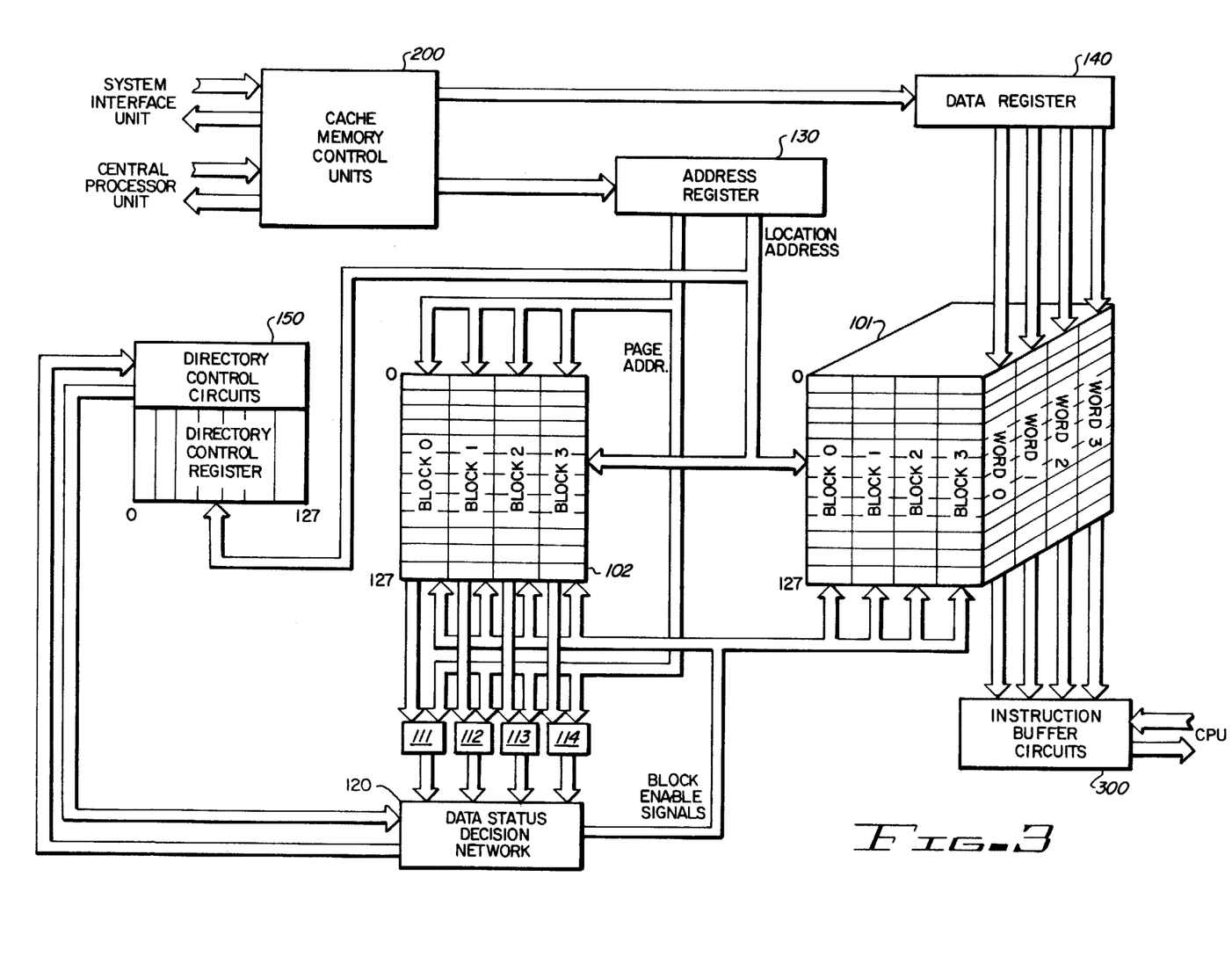
FIG. 3 is a schematic block diagram of the cache memory storage unit showing the general organizational structure.

Referring next to FIG. 3, a schematic block diagram of the principal components of a cache memory unit of a data processing system is shown. The data signals in the cache memory unit are stored in cache memory storage unit 101. This memory comprises random access memory devices in which data signals can be both read or stored into addressed memory cells and extracted from addressed memory cells. The organization of the cache memory storage unit 101 is such that there are 128 locations, LOCATION 0 through LOCATION 127. For each location, there are four groups of blocks of memory cells labelled BLOCK 0 through BLOCK 3. Each of the four blocks can contain four memory words labelled WORD 0 through WORD 3.

Four data words from a selected block of a selected location in the memory storage unit 101 can be applied to the instruction buffer circuit 300 for subsequent transfer to the data processing unit. Data signals are entered into the storage unit 101 by a data register 140, which is under the control of the cache memory control ciruits 200. The cache memory control circuits 200 also control the address register 130. Address register 130 is coupled to the cache memory storage unit 101, the cache memory directory 102, and the cache memory directory control circuits 150.

The cache memory directory 102 is divided into four blocks and each block contains 128 storage cells structures similar to the storage unit 101, without, however, the additional WORD structure. The cache memory directory also comprises random access memory circuits. The contents of the blocks of an addressed location in the memory directory 102 are applied respectively to four comparison networks 111 through 114. The output signals of the comparison networks are applied to the data status decision network 120.

The output signals of the data status decision network 120 can be applied to the four blocks of storage cells in the cache memory storage unit and to the four blocks of storage cells located in the cache memory directory in order to activate the block receiving the appropriate signals. The output signals of data status decision network 120 are also applied to the cache memory directory control circuits 150.

The address register 130 is also coupled to the four blocks of memory cells of the cache memory directory 102 and to the comparison networks 111 through 114.

The cache memory directory control circuits 150 are divided into a directory control register and directory control circuits.

Figure 4:
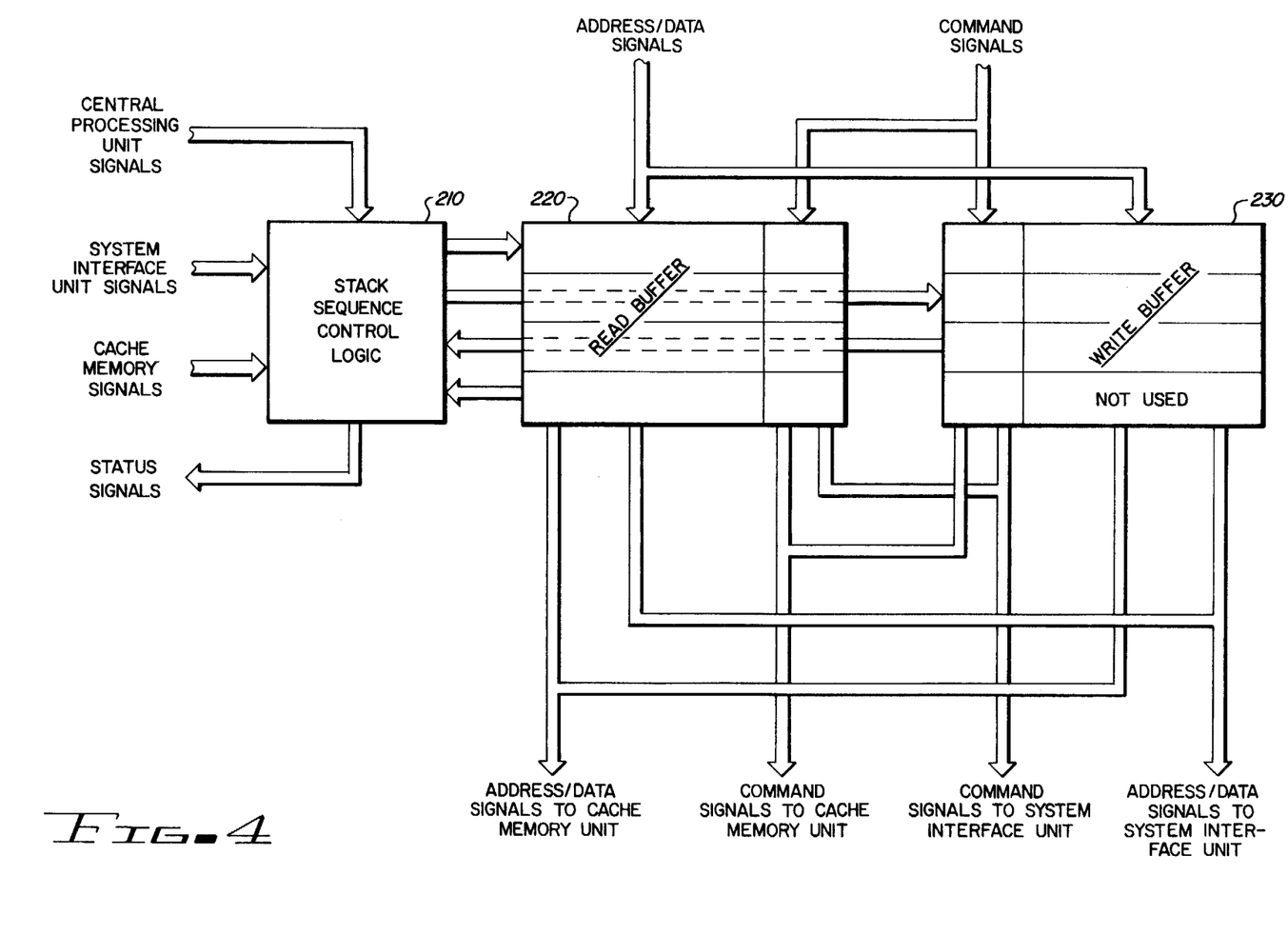
FIG. 4 is a schematic diagram of the organization of the cache command circuit storage locations according to the preferred embodiment.

Referring to FIG. 4, the cache memory control circuits 200 include two buffer register units: a four register read buffer memory unit 220 and a four register write buffer memory unit 230. The memory units can store data in an addressed location and can deliver signals to two sets of output terminals from memory locations at two independently addressed locations.

The stack sequence control logic 210 is coupled to both memory unit 220 and memory unit 230. Each buffer memory unit receives from the central processing unit address/data and command signals in response to signals from the stack sequence control logic and stores these signals in address locations determined by the control logic. The output signals of either buffer memory unit, in response to other signals from the stack sequence control unit 210, can be applied to either the cache circuits and/or applied to the system interface unit circuits, depending on how the memory units are addressed. The stack sequence conrol logic 210 receives signals from the system interface unit and signals from the cache memory unit. The stack sequence control logic issues status signals for utilization by the data processing unit.

Figures 5A, 5B:
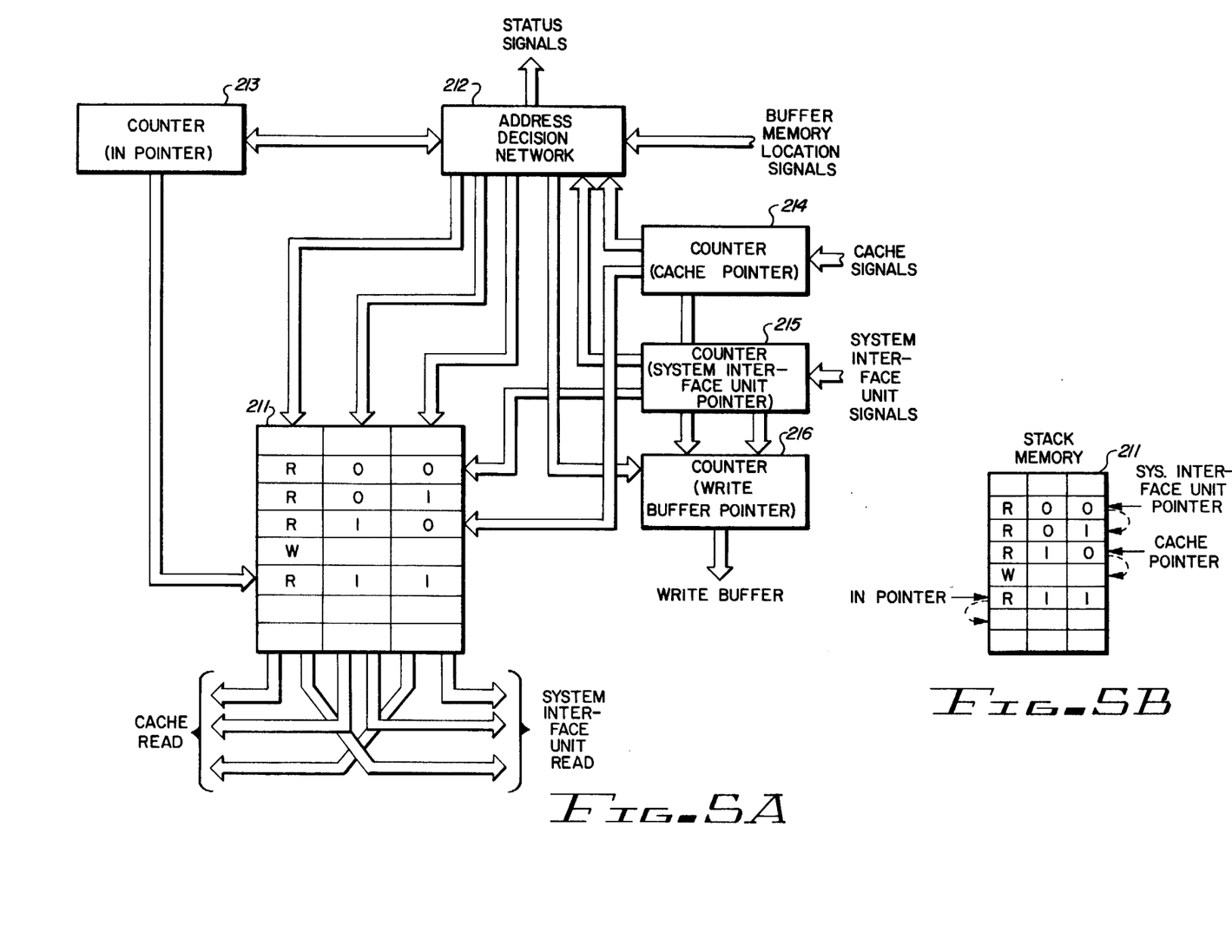
FIG. 5A is a schematic diagram of the apparatus controlling the operation of command circuit storage locations.
FIG. 5B is a schematic diagram of a possible stack memory configuration for the cache command buffer circuit according to the preferred embodient.

Referring next to FIG. 5A, the stack sequence control logic 210 is shown. The control logic includes an 8-address, 3-position memory stack 211, in which one group of data can be entered into an addressed location and two groups of memory stack signals can be simultaneously and independently extracted from addressed locations. One group of memory signals from stack 211 is coupled to first enable address apparatus for read buffer memory 220 and write buffer 230 while a second group of memory signals is coupled to second enable address apparatus associated with read buffer memory 220 and write buffer memory 230.

The output signals of counter 213 enable a data write for stack 211 at the addressed location. Output signals of counter 214 enable a first group of memory signals from stack 211 and output signals of counter 215 enable a second group of memory signals from stack 211. Counter 214 has signals from the cache unit applied thereto, while counter 215 has signals from the system interface unit applied thereto.

Address decision network 212 receives signals from buffer storage memories 220 and 230 and applies address signals to stack memory 211 and status signals to portions of the data processing system. Address decision network 212 receives signals from counter 213, counter 214, counter 215 and counter 216. Counter 216 has signals applied thereto from address decision network 212, counter 214 and counter 215, and applies signals to write buffer storage memory 230.

FIG. 5B illustrates the format in which data is stored in stack 211 and further illustrates the use of pointers for the stack.

Operation of the Preferred Embodiment

The basic use of a cache memory unit is to make available to the central processing unit data stored in the main memory unit without the wait normally associated with retrieval of the memory unit data. The cache memory is therefore a high speed memory which contains data required with some immediacy by the central processing unit for uninterrupted operation. As shown in FIG. 1, the cache memory is electrically coupled to a central processing unit and to the system interface unit. Similarly, the central processing unit can be coupled directly to the system interface unit in certain data processing systems. The actual utilization of the electrical paths coupling the system components is dependent on the method of operation. For example, in some data processing systems data can be delivered directly to the central processing unit in certain circumstances. In other systems, the data required by the central processing unit must always be delivered to the cache memory unit before being transferred to the central processing unit. As will be clear to those skilled in the art, there are a variety of methods by which the data processing unit can utilize the cache memory for more effective operation.

In the preferred embodiment, an address format of the form shown in FIG. 2 is utilized for defining an address in the main memory unit. The most significant (15) bits, indicate a page address, the second most significant (7) bits indicate a location address, while the 2 least significant bits in conjunction with the other 22 bits identify a specific word or group of data signals stored in main memory. In the preferred embodiment, the least significant bits are not used by the main memory unit in normal operation. In the typical data transfer, four data groups or words are transferred with the issuance of one instruction. Thus after the central processing unit has developed the main memory address, only the 22 most significant bits are utilized and all of the four words thereby identified are transferred.

After the central processing unit has developed the address of the required data in main memory, that main memory address is delivered to the cache memory control circuits 200 and entered in address register 130.

At this point the cache memory control circuits 200 begin a directory search cycle. The directory search cycle searches for the address of the data requested by the central processing unit in the cache memory unit.

The main memory address is entered in address register 130 as the most significant 15 bits, the page address portion of the address is applied to the four comparison registers 111–114.

Simultaneously the 7 bits of the location address portion of the main memory address are applied to the related one of the 128 locations in the cache memory storage unit, the cache memory directory 102 and the cache memory directory control register 150 of the directory control circuits. The location address enables circuits containing four blocks of data in the cache directory and the directory contents are applied to comparison circuits 111–114. The contents of the 4 blocks of the cache directory are 15 bit page main memory addresses. Thus, when the page address portion of the main memory address in the address register is found in one of the four blocks of the cache directory, a "hit" signal is applied to the data status decision network 120. The "hit" signal indicates that the desired data is stored in the related block of the same location address in the memory storage unit.

The location address portion of address register 130, when applied to the directory control circuits 150, enables the register cell storing status signals and applies these status signals to the decision network 120. In the preferred embodiment, types of status signals utilized are as follows: (1) a full/empty indicator which is a positive signal when valid data is stored in the corresponding cache memory storage unit; (2) a pending bit indicator which is positive when data is in the process of being transferred from main memory to the cache memory storage unit so that page address has already been entered in the cache memory directory; and (3) a failing block indicator which is positive when the related one of the four blocks of memory storage cells has been identified as producing errors in data stored therein.

Assuming that the status signals are appropriate when a "hit" is determined by data status decision network 120, then the valid data is in the cache memory storage unit. The location address of address register 130 has enabled four blocks of data (each containing 4 words), related to the location address in the cache memory directory. The "hit" in page address from one of the four blocks of the cache memory directory indicates that the four data words are located in the related block of the cache memory data storage unit. The data status decision network applies a signal to the appropriate block of the storage unit. The four required data words are deposited in the instruction buffer and are retrieved by the central processing unit.

The operation of the system interface unit command buffer circuit can be understood as follows. In response to signals from the central processing unit, the stack sequence control logic 210, also called stack sequence control circuit, determines an address in the buffer memory unit 220 or in the buffer memory unit 230. The stack sequence control logic then enables the storing, at the determined address, of address/data signals and command signals from the central processing unit. When the central processing unit signals a read operation, then the signals are stored in read buffer 220, and when a write operation is signaled by the central processing unit, then the signals are stored in write buffer 230.

In the preferred embodiment, the read buffer has four possible locations and the write buffer has four locations, but only three are utilized. It can be necessary to execute certain classes of write commands in the preferred embodiment which require three data group locations for complete specification. Therefore, in the cache memory command buffer locations there are a total of five possible operations which can be identified in the locations at one time, four read operations and a write operation.

It will be clear to those skilled in the art that for each operation identified in the cache buffer memory locations, manipulations involving four sets of apparatus are understood in each case. For example, the data requested by the central processing unit can be in main memory and the cache memory or in main memory alone. A command can involve the search in cache memory for a given set of data and/or the extraction from main memory via the system interface unit of that data if unavailable.

Because the system interface unit and/or the cache memory can be busy with operations involving a higher priority, it is advantageous for the operations in the system interface unit or in the cache to proceed independently of the availability of the other component involved in the transfer. For example, a write operation involves both the cache unit and the system interface unit portions of the data processing system. It is necessary that the commands be executed in sequence in order to avoid generation of erroneous data, and in addition that the portions of the command involving the cache unit or the system interface unit be individually performed in sequence. Therefore, the stack sequence control logic provides pointer signals controlling the sequential operation of a series of commands, pointer signals controlling the sequential execution of the portion of command involving the cache unit, and pointer signals controlling the sequential execution of the portion of the command involving the system interface unit. The pointer signals, in each case, are applied to the memory stack by counters.

To store data in the command buffer memories, the address decision network 212 (FIG. 5A), in response to signals from the read and write buffers, determines the address of the next available location in the buffer. This apparatus signals the availability of a command buffer memory location to the central processing unit. When the address decision network signals to the central processing unit that a command buffer memory location is free, i.e., there is no write operation present and/or there are less than four read operations stored in the command buffer memory, the counter 213 will provide in pointer signals which enable signals to be entered in the stack memory in the next sequential location addressed by the counter. Upon receipt of a address/data and command signals from the central processing unit, the address decision network will enter the command buffer memory address into which the signals are to be stored in stack memory 211. If a write operation is to be entered, a positive signal is entered in the first (of three) position of the stack memory. If a read operation is to be entered, the logical address of the next empty location in the command read buffer is entered in the last two stack memory locations. The address entered in the stack memory activates the corresponding buffer memory locations so that address/data signals and command signals are entered in the location identified by the stack memory. After the signals are entered in the buffer memory, and if the stack memory is not filled, the counter 213 is incremented and the in pointer identifies and can enable the next location in the stack memory.

The cache pointer signals are generated by counter 214 and the system interface unit pointers are generated by counter 215. When the counter 214 receives a cache signal indicating that the cache unit is ready to execute a command, the output signals from counter 214 are activated and the location addressed in the stack memory is enabled. When the location in the stack memory is enabled, the output signals of stack memory associated cache operation activate the associated address in the command buffer memory units. The address/data and the command signals are thereby activated and these signals are applied to appropriate portions of the cache unit and the operation is executed.

At the completion of the execution, the counter 214 increments to a value indicating the next sequential location and waits until enabled by an appropriate signal from the cache unit. However, the address decision network includes the logical apparatus for preventing the cache pointer (counter 214) from advancing beyond the position in the stack memory indicated by counter 213.

The system interface unit pointer from counter 215 operates in analogous manner to execute sequentially the commands delivered from the command memory units which control operation of the system interface unit.

The write buffer memory 230 has a write buffer pointer provided by counter 216 which controls the sequential operation of the contents of the write buffer memory. When the write command stored in the write buffer memory has more than one location associated therewith, the write buffer pointer activates the location in correct sequential order.

FIG. 5B illustrates schematically a potential configuration of the stack memory. The first location is empty, the second location has a read operation for read buffer memory location 00. The system interface unit pointer is shown addressing that memory location. The next stored memory location contains a read operation located at address 01 in read buffer memory. The system interface unit pointer will increment to this address when the current operation involving the cache unit is complete. The fourth stack memory location indicates a read operation at address 10 in the read buffer memory and the cache pointer is enabling this stack memory location. The fifth stack memory address contains a write operation. Because only one write operation can be stored in the buffer memory in the preferred embodiment, and one group of locations is always utilized for the write operation, no further address is necessary. The cache pointer will enable this stack memory location next. The sixth stack memory location identifies a read operation of read buffer memory address 11. The in pointer remains at this location in the stack memory until the operation identified in the second stack location is complete. Then the in pointer will increment to the seventh stack memory location, enabling a writing of address/data and command signals in this address. This illustration suggests the utilization of the read buffer memory location is controlled by a sequential or round-robin algorithm in the address decision network. It will be clear however that another algorithm could be utilized.

Utilizing the apparatus of the preferred embodiment, it is possible to provide sequential and overlapped execution of a plurality of operations involving both the cache unit and the system interface unit. In addition, the cache unit portions of the command execution can be operated in sequence independent of the sequential execution of the command in the system interface unit of the data processing system. In a normal read operation, the apparatus of the preferred embodiment would not permit extraction by the system interface unit of data from the main memory until a determination had been made that the data was not available in the cache storage units. Similarly, when the data is available in the cache storage units, the operation involving the system interface unit is aborted. However, the write command can be executed independently in the system interface unit and the cache memory unit and certain read commands, such as a read command which invalidates data in the cache storage unit, while obtaining data from main memory via the system interface unit can be executed independently.

A more detailed description of the data processing system in which the selection apparatus is utilized is found in the copending patent application "Data Processing System Programmable Pre-Read Capability" by John E. Wilhite, William A. Shelly and Charles P. Ryan, filed on Nov. 22, 1977, having Ser. No. 853,944 and assigned to the assignee of the instant invention and this patent application is hereby incorporated herein by reference.

The above description is included to illustrate the operation of the preferred embodiment and is not meant to limit the scope of the invention. The scope of the invention is to be limited only by the following claims. From the above discussion, many variations will be apparent to one skilled in the art that would yet be encompassed by the spirit and scope of the invention.

What is claimed is:

1. In a computer system which includes a central processing unit (CPU), a high speed cache memory unit, and a system interface unit (SIU) for controlling command and data transfer between a lower speed main memory and either said CPU or said cache memory unit, a cache memory cammand buffer circuit for allowing said cache memory unit and said SIU to operate independent of each other and for ensuring that commands to said cache memory unit and to said SIU are executed in proper sequence, said cache memory command buffer circuit comprising:

a read buffer for storing read signals from said CPU to said cache memory unit or to said SIU, said read signals including command, data, and address signals;

a write buffer for storing write signals from said CPU to said cache memory unit or to said SIU, said write signals including command, data, and address signals; and a sequence control circuit connected to said read and writer buffers and receiving signals from said CPU, said SIU, and said cache memory unit, said sequence control circuit including means for storing said read signals from said CPU into said read buffer and said write signals from said CPU into said write buffer and outputting said read and write signals from said buffers to said cache memory unit and to said SIU in the proper sequence and without interrupting the operation of either said cache memory unit or said SIU.

2. the cache memory command buffer circuit in claim 1 wherein said sequence control circuit includes an address decision network which receives signals from said read and write buffers and indicates to said CPU whether said read and write buffers can accept additional read and write signals from said CPU.

3. The cache memory command buffer circuit in claim 2 wherein said sequence control circuit also includes:

memory means for storing buffer pointers which point to locations in said read and write buffers;

a first pointer register coupled to said address decision network and indicating the location in said memory means at which the next buffer pointer should be placed;

a second pointer register indicating the location in said memory means which contains the buffer pointer that points to the position in said read buffer containing the next read signal to be executed to said cache memory unit;

a third pointer register indicating the location in said memory means which contains the buffer pointer that points to the position in said read buffer containing the next read signal to be executed by said SIU; and a fourth pointer register indicating the location in said memory means which contains the buffer pointer that points to the location in said write buffer containing the next write signal to be executed by said SIU or by a said cache memory unit.

4. The cache memory command buffer circuit of claim 3 wherein said first, second, third, and fourth pointer registers are binary counters.

5. In a computer system which includes a central processing unit (CPU), a high-speed cache memory unit, and a system interface unit (SIU) for controlling command and data transfer between a lower speed main memory and either said CPU or said cache memory unit, a cache memory command buffer circuit for allowing said cache memory unit and said SIU to operate independent of each other and for ensuring that commands to said cache memory unit and to SIU are executed in proper sequence, said cache memory command buffer circuit comprising:

a read buffer for storing read signals from said CPU to said cache memory unit or to said SIU, said read signals including command, data, and address signals;

a write buffer for storing write signals from said CPU to said cache memory unit or to said SIU, said read signals including command, data, and address signals; and a sequence control circuit connected to said read and write buffers and receiving signals from said CPU, said SIU, and said cache memory, said sequence control circuit including means for storing said read signals from said CPU in said read buffer and said write signals from said CPU in said write buffer and for outputting said read and write signals to said cache memory unit and to said SIU in the proper sequence without interrupting the operation of either said cache memory unit or said SIU, said sequence control circuit including an address decision network including means for forming buffer pointers corresponding to read signals and write signals from said CPU, for receiving signals from said read and write buffers and for indicating to said CPU whether said read and write buffers can accept additional read and write signals from said CPU, a stack memory containing said buffer pointers which point to locations in said read and write buffers containing said read and write signals, a stack memory counter coupled to said address decision network to indicate at what location of said stack memory that said next buffer pointer is to be placed, a cache memory counter connected to said cache memory unit and responding to a signal from said cache memory unit to cause said stack memory to produce the buffer pointer that points to the position in said read buffer containing the read signal to be executed next by a said cache memory unit, a system interface unit counter connected to said SIU and responding to a signal from said SIU to cause said stack memory to produce the buffer pointer that points to the position in said read buffer containing the read signal to be executed next by said SIU, and a write counter connected to said cache memory counter and to said system interface unit counter and causing said stack memory to produce the buffer pointer that points to the location in said write buffer to said write signal to be executed next by said SIU or said cache memory unit.

* * * * *